US010472287B2

United States Patent
Hakmeh et al.

(10) Patent No.: US 10,472,287 B2
(45) Date of Patent: Nov. 12, 2019

(54) METHOD OF MANUFACTURING A SULFIDE-BASED CERAMIC ELEMENT, PARTICULARLY FOR IR-OPTICS APPLICATIONS

(71) Applicants: CENTRE NATIONAL DE LA RECHERCHE SCIENTIFIQUE, Paris (FR); UNIVERSITE DE RENNES 1, Rennes (FR)

(72) Inventors: Noha Hakmeh, Cesson-Sevigne (FR); Odile Merdrignac-Conanec, Acigne (FR); Xiang-Hua Zhang, Cesson-Sevigne (FR)

(73) Assignees: CENTRE NATIONAL DE LA RECHERCHE SCIENTIFIQUE, Paris (FR); UNIVERSITE DE RENNES 1, Rennes (FR)

( * ) Notice: Subject to any disclaimer, the term of this patent is extended or adjusted under 35 U.S.C. 154(b) by 0 days.

(21) Appl. No.: 15/320,727

(22) PCT Filed: Jul. 8, 2015

(86) PCT No.: PCT/EP2015/065582
§ 371 (c)(1),
(2) Date: Dec. 20, 2016

(87) PCT Pub. No.: WO2016/005439
PCT Pub. Date: Jan. 14, 2016

(65) Prior Publication Data
US 2017/0144934 A1 May 25, 2017

(30) Foreign Application Priority Data

Jul. 10, 2014 (EP) .................................... 14176610

(51) Int. Cl.
| | |
|---|---|
| C04B 35/547 | (2006.01) |
| C04B 35/64 | (2006.01) |
| C04B 35/645 | (2006.01) |
| C01G 9/08 | (2006.01) |

(52) U.S. Cl.
CPC .............. *C04B 35/547* (2013.01); *C01G 9/08* (2013.01); *C04B 35/64* (2013.01); *C04B 35/645* (2013.01); *C04B 2235/666* (2013.01); *C04B 2235/667* (2013.01); *C04B 2235/9653* (2013.01)

(58) Field of Classification Search
None
See application file for complete search history.

(56) References Cited

U.S. PATENT DOCUMENTS

| | | | | |
|---|---|---|---|---|
| 4,765,931 | A * | 8/1988 | Saunders | C01F 17/0037 252/584 |
| 5,342,701 | A * | 8/1994 | Miremadi | G01N 27/12 423/561.1 |
| 5,656,815 | A | 8/1997 | Justus et al. | |
| 9,809,501 | B2 * | 11/2017 | Bayya | C04B 35/547 |
| 2006/0065878 | A1 * | 3/2006 | Sakane | C09K 11/0883 252/301.4 F |
| 2009/0057201 | A1 * | 3/2009 | Brait | B01J 23/24 208/143 |
| 2011/0174989 | A1 * | 7/2011 | Bayya | B82Y 30/00 250/472.1 |
| 2012/0223230 | A1 | 9/2012 | Ravichandran et al. | |

FOREIGN PATENT DOCUMENTS

| | | |
|---|---|---|
| GB | 379335 | * 12/1932 |
| JP | 1-238072 A | 9/1989 |
| JP | 2004-183083 A | 7/2004 |
| JP | 2009-513922 A | 4/2009 |
| JP | 2010-174316 A | 8/2010 |

OTHER PUBLICATIONS

Tomoyuki Ueno et al., "Development of ZnS Lenses for FIR Cameras," SEI Tech. Rev., vol. 69, 2009, pp. 48-53.
Christophe Chlique et al., "Transparent ZnS Ceramics by Sintering of High Purity Monodisperse Nanopowders," Journal of American Ceramics Society, vol. 96, No. 10, 2013, pp. 3070-3074.
D. C. Harris, "Sulfide-based (and particularly ZnS) materials for optical applications are currently produced by chemical vapor deposition (CVD)," Materials for Infrared Windows and Domes, Properties and Performance, Edited by SPIE—The International Society for Optical Engineering, SPIE Optical Engineering Press, Bellingham, WA, 1992, pp. 163-167.
Xi-xian Luo et al., "Ethanol-assistant solution combustion method to prepare LA2O2S:Yb,Pr nanometer phosphor," Journal of Alloys and Compounds, vol. 460, 2008, pp. 529-534.
C. Chlique, PhD Thesis at University of Rennes 1, Rennes, France, defended on Nov. 29, 2011, pp. 127.
English Translation of Notice of Rejection issued in Japanese Patent Application No. 2017-500924 dated May 28, 2019.

* cited by examiner

*Primary Examiner* — Sheng H Davis
(74) *Attorney, Agent, or Firm* — Baker & Hostetler LLP

(57) ABSTRACT

A method of manufacturing a sulfide-based ceramic element, such as a transparent infrared optical element, comprises the steps of: synthesizing a sulfide powder; and sintering the powder to form the ceramic element; wherein the step of synthesizing the sulfide powder is performed by combustion in an aqueous solution, the solution comprising water as its only solvent, or containing water as its main solvent and at most 10%, and preferably at most 1% of the overall solvent mass, of one or more combustible solvents. The sulfide powder may be chosen, in particular, among ZnS, $BaLa_2S_4$, $CaLa_2S_4$.

10 Claims, 4 Drawing Sheets

METHOD OF MANUFACTURING A SULFIDE-BASED CERAMIC ELEMENT, PARTICULARLY FOR IR-OPTICS APPLICATIONS

This application is a National Stage of International patent application PCT/EP2015/065582, filed on Jul. 8, 2015, which claims priority to foreign European patent application No. EP 14176610.5, filed on Jul. 10, 2014, the disclosures of which are incorporated by reference in their entirety.

Field of the invention

The invention relates to a method of manufacturing a sulfide-based ceramic element, and more particularly a sulfide-based ceramic element transparent in the infrared for infrared optics applications.

Materials showing good transparency in the infrared part of the electromagnetic spectrum, and particularly in the medium and far infrared (wavelength greater than or equal to 3μ m), are required for several applications, both military and civilian. They can be used as laser host materials, or for making windows, lens or other optical elements for lasers, thermal cameras, night-vision systems, missile-guidance heads, etc.

Oxides and fluorides have emerged as the material of choice in the near infrared (1-3 μm); chalcogenide glasses and germanium crystals are used in the medium infrared, in the 8-12 μm window, while sulfide-based ceramics, and more particularly ZnS, $BaLa_2S_4$ and $CaLa_2S_4$, are very promising at greater wavelengths. ZnS is already currently used in military applications.

Sulfide-based (and particularly ZnS) materials for optical applications are currently produced by chemical vapor deposition (CVD), see e.g. D. C. Harris, *Materials for Infrared Windows and Domes, Properties and Performance,* Edited by SPIE—The International Society for Optical Engineering. SPIE Optical Engineering Press, Bellingham, Wash., 1992. This technique, however, is complex and expensive.

Sintering, and more particularly hot-pressing, has been studied as an alternative method of manufacturing ZnS optical elements, see e.g. T. Ueno, M. Hasegawa, M. Yoshimura, H. Okada, T. Nishioka, K. Teraoka, A. Fujii, and S. Nakayama, "Development of ZnS Lenses for FIR Cameras" *SEI Tech. Rev.,* 69, 48-53 (2009 ). These elements, however, are not transparent in the visible part of the spectrum due to very high scattering losses.

C. Chlique and his coworkers (including the present inventors) have studied the hot pressing sintering of ZnS powders synthesized by precipitation. See: Christophe Chlique, Odile Merdrignac-Conanec, Noha Hakmeh, Xianghua Zhang, and Jean-Luc Adam "Transparent ZnS Ceramics by Sintering of High Purity Monodisperse Nanopowders" *J. Am. Ceram. Soc.,* 1-5(2013).

In the PhD thesis of C. Chlique (University of Rennes 1, Rennes, France, defended on Nov. 29, 2011), $BaLa_2S_4$ and $CaLa_2S_4$ powders were synthesized by combustion in an ethanol-containing solution (Ethanol-assistant solution combustion, or EASC). The EASC synthesis technique had previously been developed by Xi-xian Luo and Wang-he Cao for a different application, namely preparing $La_2O_2S$:Yb,Pr phosphors. See: Xi-xian Luo and Wang-he Cao "Ethanol-assistant solution combustion method to prepare $LA_2O_2S$:Yb,Pr nanometer phosphor" *Journal of Alloys and Compounds* 460 (2008) 529-534.

None of the known methods is entirely satisfying, and the powder synthesis step turns out to be particularly unsatisfactorily. In particular, precipitation synthesis is insufficiently reproducible, while EASC is unsuitable to be applied at industrial scale as the combustion reaction is too violent, and even potentially explosive. Other powder synthesis methods often lead to precursor powders containing too many impurities for optical applications. Moreover, contamination of the ceramics by carbon during the sintering step limits the transparency of the obtained elements.

Summary of the Invention

The invention aims at overcoming, wholly or partially, the above-mentioned drawbacks of the prior art. More particularly, it aims at providing a simple and reproducible method for manufacturing, at industrial scale, sulfide-based ceramic elements sufficiently transparent in the infrared to be used as IR-optical components, or as raw materials for manufacturing such components.

According to the invention, this aim is achieved by sintering a precursor powder synthesized by combustion in an aqueous solution containing no ethanol, or any other solvent—and in particular any other combustible solvent—or at most a small fraction of it (no more than 10% of the overall solvent mass, and preferably much less). It is worth noting that the inventive method goes directly against the teaching of Xi-xian Luo and Wang-he Cao, for which ethanol pre-ignition is essential. The present inventors have discovered that, in fact, combustion synthesis is also possible in an aqueous solution comprising no combustible solvent, but only a metal-containing oxidizing agent and a sulfur-containing organic fuel, which react exothermally to produce the desired precursor powder. The absence of ethanol—or a substantial reduction of its amount—makes the combustion (redox) reaction less violent, and therefore more reproducible and more suitable to industrial application. Unexpectedly, the resulting precursor powder is also purer and less reactive—and therefore less prone to carbon contamination—than the powders obtained by precipitation or EASC. These are desirable features, which allow a small but non-negligible improvement of the transparency of the sintered material.

Therefore, an object of the invention is a method of manufacturing a sulfide-based ceramic element comprising the steps of:
synthesizing a sulfide powder; and
sintering said powder to form said ceramic element;
characterized in that said step of synthesizing said sulfide powder is performed by combustion in an aqueous solution, said solution comprising water as its only solvent, or containing water as its main solvent (i.e. the most abundant solvent, by mass) and at most 10%, and preferably at most 1% of the overall solvent mass, of one or more other solvents.

Particular embodiments of such a method constitute the subject-matter of the dependent claims.

BRIEF DESCRIPTION OF THE DRAWINGS

Additional features and advantages of the present invention will become apparent from the subsequent description, taken in conjunction with the accompanying drawings, which show.

DETAILED DESCRIPTION

Combustion synthesis is based on a redox reaction in an aqueous solution containing stoichiometric amounts of an oxidizing agent (typically a metal nitrate) and an organic fuel; advantageously, the fuel is also the source of the sulfur which reacts with the metal of the oxidizing agent to form a sulfide; it can then be a thioamide such as thioacetamide.

The reagents used for the synthesis of ZnS were hexahydrated zinc nitride $Zn(NO_3)_2 \cdot 6H_2O$ (Alfa Aesar 99.998%) and thioacetamide (TAA) $CH_3CSNH_2$ (Sigma Aldrich ≥99%, ACS Reagent), and distilled water was used as the sole solvent. The masses of the reagents were computed using the following equations:

$n_{ZnS}=m_{ZnS}/M_{ZnS}$ with $m_{ZnS}$=mass of ZnS to be produced and $M_{Zns}$=97,445 g/mol $M_{Zn(NO3)2.6H2O}=n_{ZnS} \cdot M_{Zn(NO3)2.6H2O}$ with $M_{Zn(NO3)2.6H2O}$ =297.481 g/mol $m_{TAA}=2n^*_{ZnS}*M_{C2H5NS}$ with $M_{C2H5NS}$=75,133 g/mol The reagents were introduced into a beaker containing distilled water (the volume of water is not essential). The mix was heated at a temperature lower than 100° C.—preferably between 70° C. and 80° C.—and stirred until zinc nitrate and TAA were completely dissolved. The solution was then placed in a muffle furnace pre-heated at 500° C.-600° C. (more broadly, the furnace temperature may be comprised between 400° C. and 800° ). The reaction occurred within about 15 minutes. The beaker was maintained 15-30 additional minutes after the completion of the reaction to eliminate possible residues and to obtain a white, homogeneous powder which was recuperated and grinded.

Figure 1:
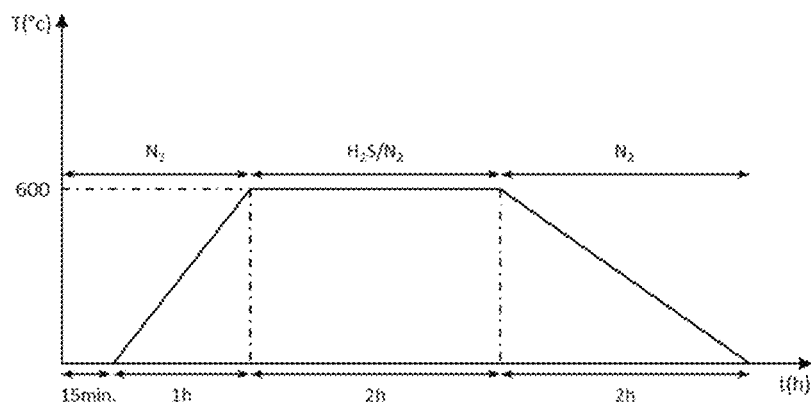
FIG. 1, the thermal profile of a ZnS powder purification step of a method according to an embodiment of the invention.
Figure 2A:
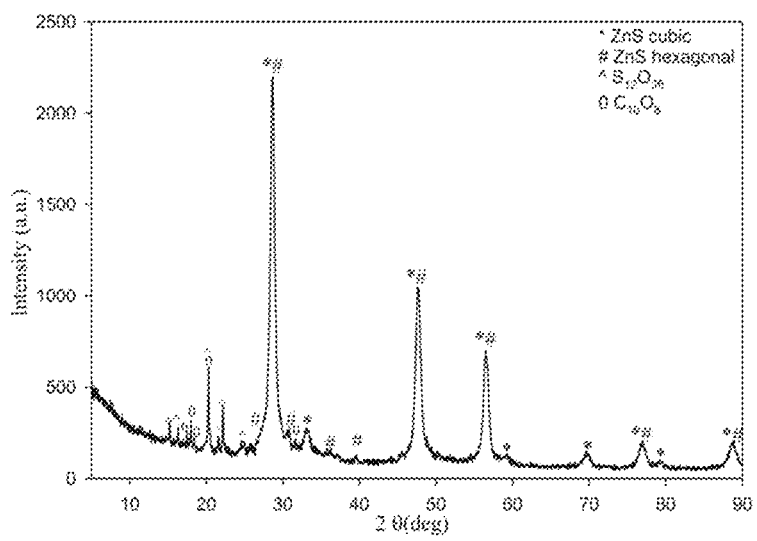
FIGS. 2A and 2B, x-rays diffractograms of ZnS powder obtained by combustion alone and combustion followed by purification, respectively.
Figure 2B:
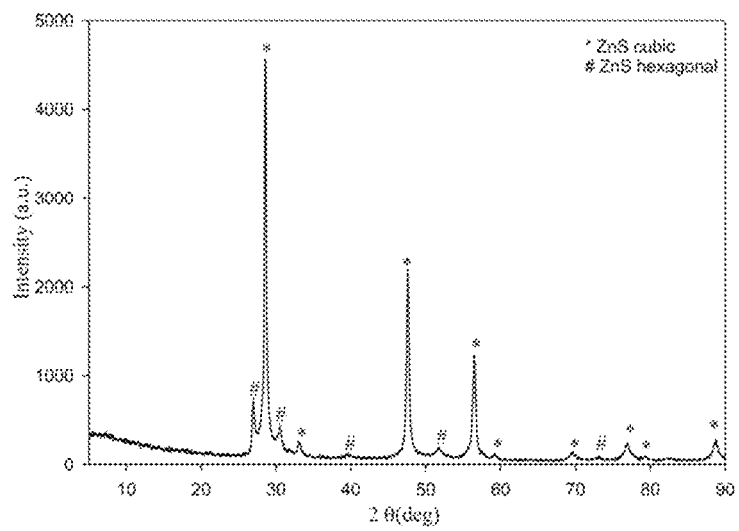

Due to the fast kinetic of the combustion reaction, the crystallization of the produced ZnS was incomplete, and impurities were present. Therefore, a thermal post-treatment (sulfuration) of the ZnS powder under a gaseous H2S/N2 mixture (10/90) was performed. The powder, placed in a silica reaction tube, was introduced into the isothermal zone of a tunnel furnace. The reaction tube was purged under a nitrogen flow during a few (10-15) minutes, then heated at a temperature between 600° C. and 700° C. at a rate of 10° C./min. The nitrogen flow was then replaced by the H2S/N2 mixture. The treatment at 600° C. and 700° C. was continued for two hours; then cooling to ambient temperature was performed under nitrogen flow. The thermal profile of the post-treatment is illustrated on FIG. 2.

Figure 3:
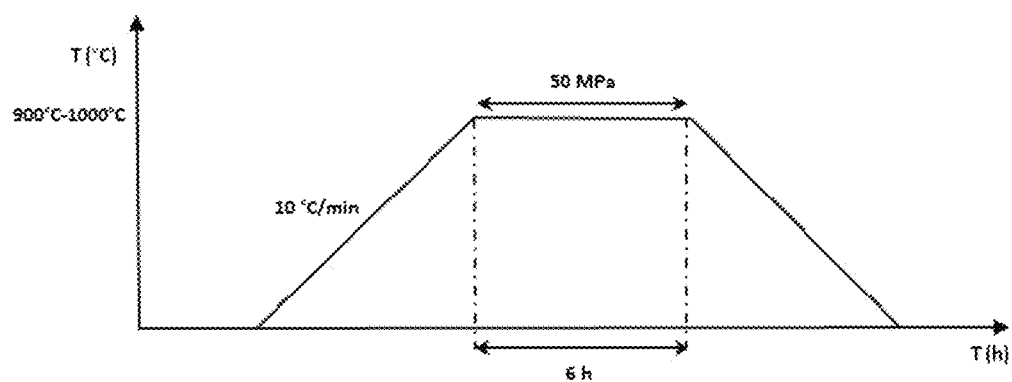
FIG. 3, the thermal profile of a ZnS powder hot-pressing sintering step of a method according to an embodiment of the invention.

FIG. 3A shows a x-ray diffractogram of the raw ZnS powder obtained by combustion in aqueous solution. It can be seen that the powder is quite well crystallized and comprises a majority cubic phase and a minority hexagonal phase; non-negligible amounts of S12O36 and C10O8 are present. FIG. 3B shows a x-ray diffractogram of the powder after the thermal post-treatment of FIG. 2. It can be seen that crystallization is improved and impurities have disappeared.

The sintering of the sulfurated ZnS powder is performed at a temperature lower than 1020° C. to avoid a sphalerite—wurtzite phase transition.

The powder was sintered under vacuum (10-2mbar or less) at 900° C.-1000° C. (preferably 950° C.) with a heating rate comprised between 5° C./min and 30° min, e.g. of 10° C./min. A pressure of 50 MPa was applied at the sintering temperature for a duration varying between 30 min (quite unsatisfactory, see below) and 6 h or more (optimal), then released during cooling. The thermal profile of the sintering step is illustrated on FIG. 3.

Typically 4 to 5 g of ZnS powder are sintered in a graphite die (diameter: 20 mm), between two thin layers of boron nitride (Alfa Aesar, metal basis 99.5%) to hinder carbon diffusion—leading to contamination of the ceramics—and to ease the removal of the sintered ceramics from the die. Then, optical elements such as lenses—or simply optical window—may be manufactured from the thus-obtained ceramic element using conventional techniques such as cutting, grinding, polishing, hole drilling etc.

Figure 4:
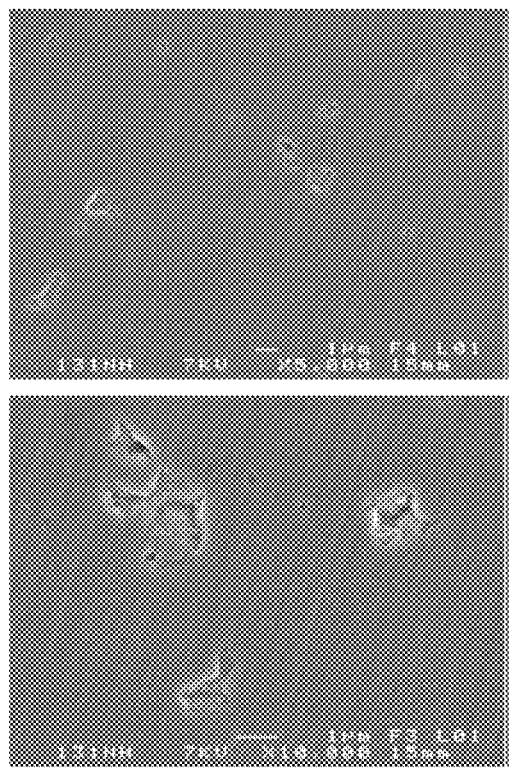
FIG. 4, two scanning electron microscope (SEM) micrographs of a ZnS ceramic element obtained by a method according to an embodiment of the invention.

FIG. 4 shows two scanning electron microscope (SEM) micrographs of polished surfaces of a ZnS ceramic element obtained by the method described above, where no porosity is visible.

Figure 5:
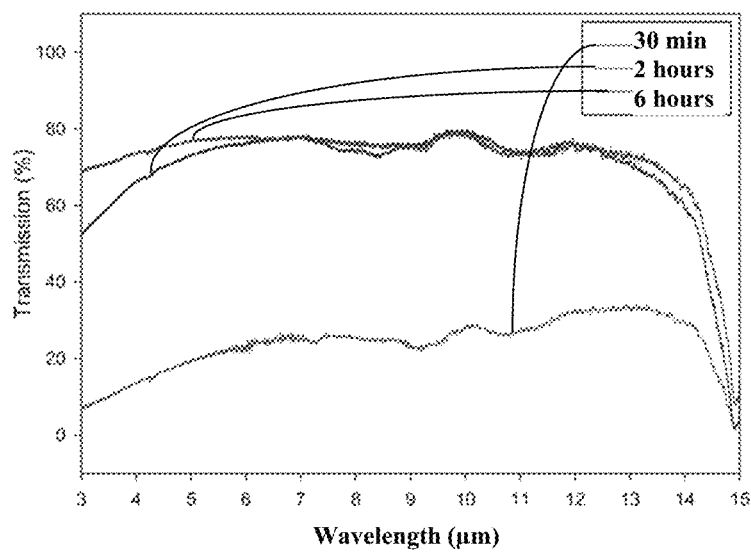
FIG. 5, transmission spectra of ZnS ceramic elements obtained by a method according to an embodiment of the invention, for three different durations of the sintering step.

FIG. 5 shows the IR transmission spectrum of a 1 mm-thick sample of the ZnS ceramic obtained by the method above for three different durations of the sintering step: 30 minutes, 2 h and 6 h. The best results are achieved for a 6 h process, with transmission above 75% in a 4 μm-13 μm and achieving almost 80% around 10 μm. A 2 h process can be quite satisfactory if only wavelengths above 7 μm are of interest.

Figure 6:
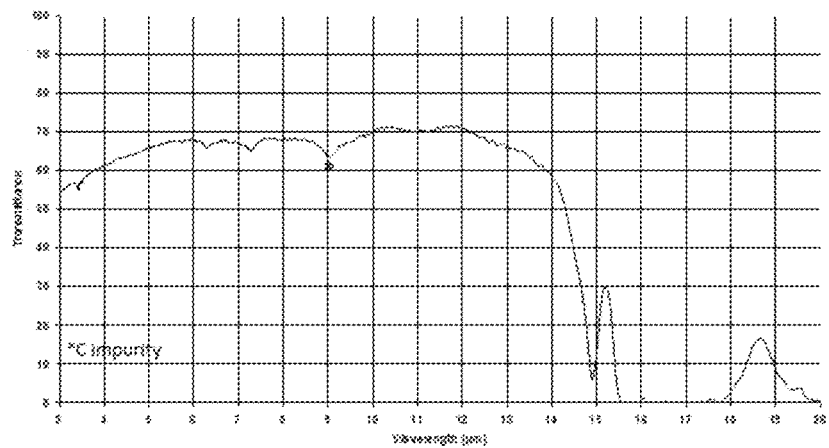
FIG. 6, transmission spectra of ZnS ceramic elements obtained by hot-pressing of a precursor ZnS powder obtained by the prior-art precipitation method.
Figure 7:
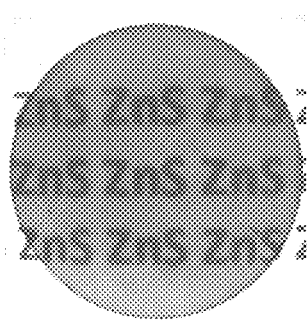
FIG. 7, a photograph of a ZnS ceramic element obtained by a method according to an embodiment of the invention.

For the sake of comparison, FIG. 6 shows the IR transmission spectrum of a 1 mm-thick sample of the ZnS ceramic obtained by hot-pressing (2 h) of ZnS powder obtained by precipitation according to the method described in the above-referenced paper by C. Chlique et al. It can be seen that the transmission is slightly—but appreciably—lower than in the case of the inventive method and that a dip (highlighted by a star) due to carbon contamination is present. This confirms that precipitation produces powders which are more prone to carbon contamination than those obtained by the inventive method. This is further confirmed by FIG. 7, showing a photograph of a ceramic element obtained by the inventive method (6 h sintering at 50 MPa). It can be seen that the element is substantially transparent to visible light.

The inventive method has been described with reference to the specific case of ZnS ceramic elements, but it can be easily generalized to other sulfur-based ceramics, in particular to other IR-transparent ones, and more particularly to BaLa2S4 and CaLa2S4. Of course, the reagents change: while thioamides and in particular TAA can always be used as a fuel, the oxidizing agents, either hydrated or anhydrous, are lanthanum nitrate and barium nitrate for BaLa2S4 synthesis, and lanthanum nitrate and calcium nitrate for CaLa2S4 synthesis. Sulfuration is performed essentially in the same way as for ZnS, while sintering can be performed at a somehow higher temperature (950-1300 ° C.).

Sintering pressure is preferably greater than or equal to 30 MPa; the upper pressure limit is set by the die; for graphite dies it is of abut 150 MPa. The sintering temperature is preferably comprised between 850° and 1000° C. for ZnS, and between 950° C. and 1300° C. for ternary sulfides such as BaLa2S4 and CaLa2S4.

The invention has been described with reference to a preferred embodiment wherein water is the sole solvent used in the combustion synthesis step. However, the invention does not exclude alternative embodiments wherein a small (no more than 10% by mass) amount of other solvents—possible combustible ones—is present. Such "complementary" solvents may include ethanol, methanol, acetone (all of which are combustible) and/or nitric acid (which is not).

The inventive method have been described with reference to a preferred embodiment wherein sintering is performed by hot-pressing. However, other sintering method—may be used, such as flash sintering, also known as spark plasma sintering, hot isostatic pressing, microwave sintering and natural sintering.

The invention claimed is:

1. A method of manufacturing a sulfide-based transparent infrared optical ceramic element comprising the steps of:
    synthesizing a sulfide powder; and
    sintering said powder to form said ceramic element;
    wherein said step of synthesizing said sulfide powder is performed by combustion in the presence of water by heating the aqueous solution at a temperature comprised between 400° C. and 800° C., said solution comprising 90-100% water and 0-10% of one or more non-water solvents based on the overall solvent mass.

2. The method according to claim 1 wherein said sulfide powder is chosen among ZnS, $BaLa_2S_4$ and $CaLa_2S_4$.

3. The method according to claim 1 wherein said step of synthesizing said sulfide powder comprises preparing an aqueous solution of a metal-containing oxidizing agent and a sulfur-containing organic fuel.

4. The method according to claim 3 wherein said metal-containing oxidizing agent is a metal nitrate.

5. The method according to claim 3 wherein said sulfur-containing organic fuel is a thioamide.

6. The method according to claim 3 wherein said sulfur-containing organic fuel is thioacetamide.

7. The method according to claim 1 wherein said solution is heated at a temperature comprised between 500° C. and 600° C. in a furnace.

8. The method according to claim 1 further comprising a step of performing a thermal post-treatment of said powder under a $H_2S/N_2$ flow prior to said sintering step.

9. The method according to claim 1 wherein said step of sintering said powder is performed by a method chosen from: hot pressing, spark plasma sintering, hot isostatic pressing, microwave sintering, natural sintering.

10. The method according to claim 1 wherein said step of sintering said powder is performed in a graphite die, using buffer layers of boron nitride powder interposed between the die and the powder to be sintered.

* * * * *